(12) United States Patent
Won et al.

(10) Patent No.: US 10,486,488 B2
(45) Date of Patent: Nov. 26, 2019

(54) COMPACT AIR CONDITIONING MODULE FOR PERFORMING COOLING AND HEATING THROUGH A SINGLE MODULE

(71) Applicant: Hanon Systems, Daejeon-si (KR)

(72) Inventors: Jong Bo Won, Daejeon-si (KR); Sang Gu Woo, Daejeon-si (KR); Dong Kyu Lee, Daejeon-si (KR); Tae Yong Park, Daejeon-si (KR); Yong Nam Ahn, Daejeon-si (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/572,716

(22) PCT Filed: Nov. 21, 2016

(86) PCT No.: PCT/KR2016/013393
§ 371 (c)(1),
(2) Date: Nov. 8, 2017

(87) PCT Pub. No.: WO2017/090943
PCT Pub. Date: Jun. 1, 2017

(65) Prior Publication Data
US 2018/0264911 A1    Sep. 20, 2018

(30) Foreign Application Priority Data

Nov. 27, 2015 (KR) .......... 10-2015-0167540
Nov. 27, 2015 (KR) .......... 10-2015-0167543

(51) Int. Cl.
*B60H 1/00* (2006.01)
*B60H 1/32* (2006.01)

(52) U.S. Cl.
CPC ..... *B60H 1/00514* (2013.01); *B60H 1/00021* (2013.01); *B60H 1/00028* (2013.01);
(Continued)

(58) Field of Classification Search
CPC ........... B60H 1/00021; B60H 1/00028; B60H 1/00064; B60H 1/00071; B60H 1/00514;
(Continued)

(56) References Cited

U.S. PATENT DOCUMENTS

| 7,159,651 B2 * | 1/2007 | Ito .................. B60H 1/00007 165/202 |
| 2009/0193830 A1 * | 8/2009 | Yoshioka ............ B60H 1/0005 62/239 |

(Continued)

FOREIGN PATENT DOCUMENTS

| KR | 100860924 B1 | 9/2008 |
| KR | 100996810 B1 | 11/2010 |

(Continued)

*Primary Examiner* — Edward F Landrum
*Assistant Examiner* — Daniel C Comings
(74) *Attorney, Agent, or Firm* — Shumaker, Loop & Kendrick, LLP; James D. Miller

(57) ABSTRACT

An air conditioning module including a compressor for inhaling and compressing a refrigerant, a condenser for condensing the refrigerant compressed in the compressor, and an expansion means for throttling the refrigerant condensed in the condenser. An evaporator evaporates the refrigerant supplied through the expansion means. The air conditioning module also includes a housing including a first passageway, a second passageway, a first discharge passageway, and a second discharge passageway.

15 Claims, 12 Drawing Sheets

(52) U.S. Cl.
CPC .......... *B60H 1/00564* (2013.01); *B60H 1/32* (2013.01); *B60H 2001/00078* (2013.01); *B60H 2001/00092* (2013.01); *B60H 2001/00178* (2013.01)

(58) Field of Classification Search
CPC ............ B60H 1/00542; B60H 1/00564; B60H 2001/00078; B60H 2001/00092; B60H 2001/00114; B60H 2001/00121; B60H 2001/00178
See application file for complete search history.

(56) References Cited

U.S. PATENT DOCUMENTS

| | | | | |
|---|---|---|---|---|
| 2011/0120528 | A1* | 5/2011 | West .................... | F24F 5/0096 |
| | | | | 136/248 |
| 2013/0112282 | A1* | 5/2013 | Uto ................... | B60H 1/00535 |
| | | | | 137/15.01 |
| 2014/0377095 | A1* | 12/2014 | Yano .................. | F04D 25/0693 |
| | | | | 417/411 |
| 2015/0082820 | A1* | 3/2015 | Takahashi ............ | B60H 1/0005 |
| | | | | 62/238.7 |
| 2015/0306935 | A1* | 10/2015 | Shichiken ............ | B60H 1/0005 |
| | | | | 165/47 |

FOREIGN PATENT DOCUMENTS

| | | |
|---|---|---|
| KR | 20140100708 A | 8/2014 |
| KR | 101558001 B1 | 10/2015 |
| KR | 101566747 B1 | 11/2015 |

* cited by examiner (a)

(b)

(a)

(b)

COMPACT AIR CONDITIONING MODULE FOR PERFORMING COOLING AND HEATING THROUGH A SINGLE MODULE

CROSS-REFERENCE TO RELATED PATENT APPLICATIONS

This patent application is a United States national phase patent application based on PCT/KR2016/013393 filed Nov. 21, 2016, which claims the benefit of Korean Patent Application No. 10-2015-0167540 filed Nov. 27, 2015 and Korean Patent Application No. 10-2015-0167543 filed Nov. 27, 2015, the entire disclosures of which are hereby incorporated herein by reference.

TECHNICAL FIELD

The present invention relates to an air conditioning module, and more particularly, to an air conditioning module, which can perform cooling and heating through a single module, which is capable of being compact-sized, which can easily control a flow of heated or cooled air, which can disperse weight because a compressor is mounted in a first space and the other components are mounted in a second space, and which is easy in carrying due to a handle.

BACKGROUND ART

An air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

FIG. 1 is a schematic diagram showing an example of a conventional air conditioner for a vehicle. The conventional air conditioner for the vehicle includes: an air-conditioning case 10 which has vents 11, 12 and 13 adjusted in the degree of opening by doors 11d, 12d and 13d; a blowing part 14 connected to an inlet of the air-conditioning case 10 to blow outside air; an evaporator E and a heater core H disposed inside the air-conditioning case 10; and a temp door 15 for adjusting the degree of opening of a cooled air passageway and a heated air passageway of the air-conditioning case 10. When a cooling cycle is operated, the temp door 15 opens the cooled air passageway and closes the heated air passageway. Therefore, the air blown by the blowing part 14 exchanges heat with refrigerant flowing inside the evaporator E and is changed into cooled air while passing through the evaporator E, and then, is discharged to the interior of the vehicle through the opened vents 11, 12 and 13 so as to cool the interior of the vehicle. Moreover, when a heating cycle is operated, the temp door 15 closes the cooled air passageway and opens the heated air passageway, the blown air exchanges heat with cooling water flowing inside the heater core H while passing the heater core H through the heated air passageway and is changed into heated air, and then, is discharged to the interior of the vehicle through the vents 11, 12 and 13 so as to warm the interior of the vehicle.

In this instance, in order to supply cold refrigerant to the first evaporator, as shown in FIG. 2, a compressor 1 which compresses and sends refrigerant, a condenser 2 which condenses the refrigerant of high pressure sent from the compressor 1, an expansion valve 3 for throttling the refrigerant condensed and liquefied in the condenser 2; an evaporator E for exchanging heat between the liquefied refrigerant of low pressure throttled by the expansion valve 3 and evaporating the refrigerant to cool the air discharged to the interior of the vehicle due to heat absorption by evaporative latent heat; and refrigerant pipes 5 through which the compressor 1, the condenser 2, the expansion valve 3 and the evaporator E are connected with one another. In the meantime, as described above, the evaporator E is disposed inside the air-conditioning case 10, the condenser 2 is located at the front of the vehicle in order to cool the refrigerant using traveling wind, and the compressor 1 is located inside an engine room because it is operated by an engine actuating belt. Therefore, the conventional air-conditioning system has a disadvantage in that connection of the pipes 5 becomes complicated.

In the meantime, in order to cool the interior of a vehicle, such as a truck, even in a state where the engine is not operated, an anti-start air-conditioner for a vehicle operated by a battery as a power source has been proposed. Such an anti-start air-conditioner for a vehicle is illustrated in FIGS. 3 and 4. FIG. 3 is a perspective view of the anti-start air-conditioner for the vehicle, and FIG. 4 is a schematic diagram of the anti-start air-conditioner for the vehicle. The anti-start air-conditioner for the vehicle includes: first and second compressors 10a and 10b operated by the battery for the vehicle as a power source; a lying-type condenser 20 including first and second condensing parts 20a and 20b, which are respectively communicated with the first and second compressors 10a and 10b and have condenser inlets 21 to which refrigerant is induced and condenser outlets 22 through which the induced refrigerant is discharged after exchanging heat with outside air; first and second capillary tubes 30a and 30b which are respectively communicated with the condenser outlets 22 formed in the first and second condensing parts 20a and 20b; and first and second evaporators 40a and 40b which are respectively communicated with the first and second capillary tubes 30a and 30b and have first evaporator inlets 41 to which refrigerant is induced and first evaporator outlets 42 through which the induced refrigerant is discharged to the first and second compressors 10a and 10b after exchanging heat with the inside air.

However, the conventional air-conditioning system for the vehicle uses engine cooling water in order to perform heating, and the anti-start air-conditioner for the vehicle must have a heater mounted to heat the interior of the vehicle even in the state where the engine is not operated.

Therefore, an apparatus, which can perform heating and cooling at the same time, has a compact size and is easily installed in a vehicle is demanded, and especially, an apparatus which can properly perform heating and cooling even in the state where the engine is stopped or is not in use is demanded.

SUMMARY

Accordingly, the present invention has been made in an effort to solve the above-mentioned problems occurring in the prior arts, and it is an object of the present invention to provide an air conditioning module, which can perform cooling and heating through a single module, is capable of being compact-sized, and is easy in installation.

It is another object of the present invention to provide an air conditioning module, which can disperse weight by effectively utilizing spaces of the air conditioning module, and which is easy in carrying by a user due to a handle.

To achieve the above objects, the present invention provides an air conditioning module including: a compressor for inhaling and compressing refrigerant; a condenser for condensing the refrigerant compressed in the compressor; expansion means for throttling the refrigerant condensed in the condenser; an evaporator for evaporating the refrigerant supplied through the expansion means; and a housing, which has a first passageway for transferring the air passing through the condenser to the interior of the vehicle, a second passageway for transferring the air passing through the evaporator to the interior of the vehicle, a first discharge passageway through which the air passing through the condenser is discharged out, and a second discharge passageway, which is formed adjacent to the first discharge passageway, and through which the air passing through the evaporator is discharged out.

Moreover, the air conditioning module further includes: a first blowing part for blowing air to pass through the condenser so as to be heated; a first door for adjusting a flow of the air blown by the first blowing part; a second blowing part for blowing air to pass through the evaporator so as to be cooled; a second door for adjusting a flow of the air blown by the second blowing part.

Furthermore, the housing includes: a first inflow part hollowed at a certain area to transfer the air to the condenser; and a second inflow part hollowed at a certain area to transfer the air to the evaporator. The first blowing part and the first door are mounted inside the first passageway of the housing, the second blowing part and the second door are mounted inside the second passageway of the housing, the first discharge hole, which is hollowed at a certain area of the first passageway, is opened and closed by the first door, and the second discharge hole, which is hollowed at a certain area of the second passageway, is opened and closed by the second door.

Additionally, parts of the first passageway and the second passageway, which protrude toward a passenger, are formed at one side of the housing to be side by side in the height direction. Here, the first discharge passageway and the second discharge passageway are opened to the bottom surface of the housing. In addition, the first discharge passageway is located in the middle in the longitudinal direction of the first door and the second door, and the second discharge passageway is formed at both sides of the first discharge passageway. Moreover, in the housing, actuating means for actuating the first door and the second door and a certain area of a pipeline for connecting the compressor, the condenser, the expansion means and the evaporator are located on the second discharge passageway.

Furthermore, the air condition module has the expansion means of an orifice form of which the inner space, through which the refrigerant passes, decreases gradually and increases gradually and is embedded in the housing, and the first blowing part and the second blowing part adopt a cross flow fan type.

According to an embodiment of the present invention, in the case of heating, the first door closes the first discharge hole and opens the first passageway and the second door closes the second passageway and opens the second discharge hole such that the air heated by passing through the condenser is transferred to the interior of the vehicle through the first passageway and the air cooled by passing through the evaporator is discharged through the second discharge hole and the second discharge passageway. In the case of cooling, the second door closes the second discharge hole and opens the second passageway and the first door closes the first passageway and opens the first discharge hole such that the air cooled by passing through the evaporator is transferred to the interior of the vehicle through the second passageway and the air heated by passing through the condenser is discharged through the first discharge hole and the first discharge passageway.

According to an embodiment of the present invention, the condenser, the evaporator, the first blowing part and the second blowing part are mounted at the other side of the housing in the longitudinal direction. Furthermore, the housing is divided into a first space and a second space in the longitudinal direction, and the compressor is mounted in the first space and the condenser, the expansion means, the evaporator, the first blowing part, the first door, the second blowing part and the second door are mounted in the second space.

Additionally, the housing forms a space where the air supplied through the first blowing part and the second blowing part is transferred to the interior of the vehicle or is discharged out by actuation of the first door and the second door. In addition, the housing includes a handle located at the upper side thereof in consideration of the center of gravity of the longitudinal direction. Moreover, the air conditioning module includes a circuit board disposed in the first space of the housing to operate the compressor. Furthermore, the circuit board is perpendicular to the longitudinal direction.

As described above, the air conditioning module according to an embodiment of the present invention can perform cooling and heating through a single module, is capable of being compact-sized, and is easy in installation. Moreover, the air conditioning module according to an embodiment of the present invention can evenly disperse weight of the air conditioning module because the compressor and other components are arranged dispersively, thereby being installed stably. Additionally, the air conditioning module according to an embodiment of the present invention is easy in carrying when a user uses the handle.

DETAILED DESCRIPTION OF EMBODIMENTS

Hereinafter, reference will be now made in detail to air conditioning module according to a preferred embodiment of the present invention with reference to the attached drawings.

Figure 1:
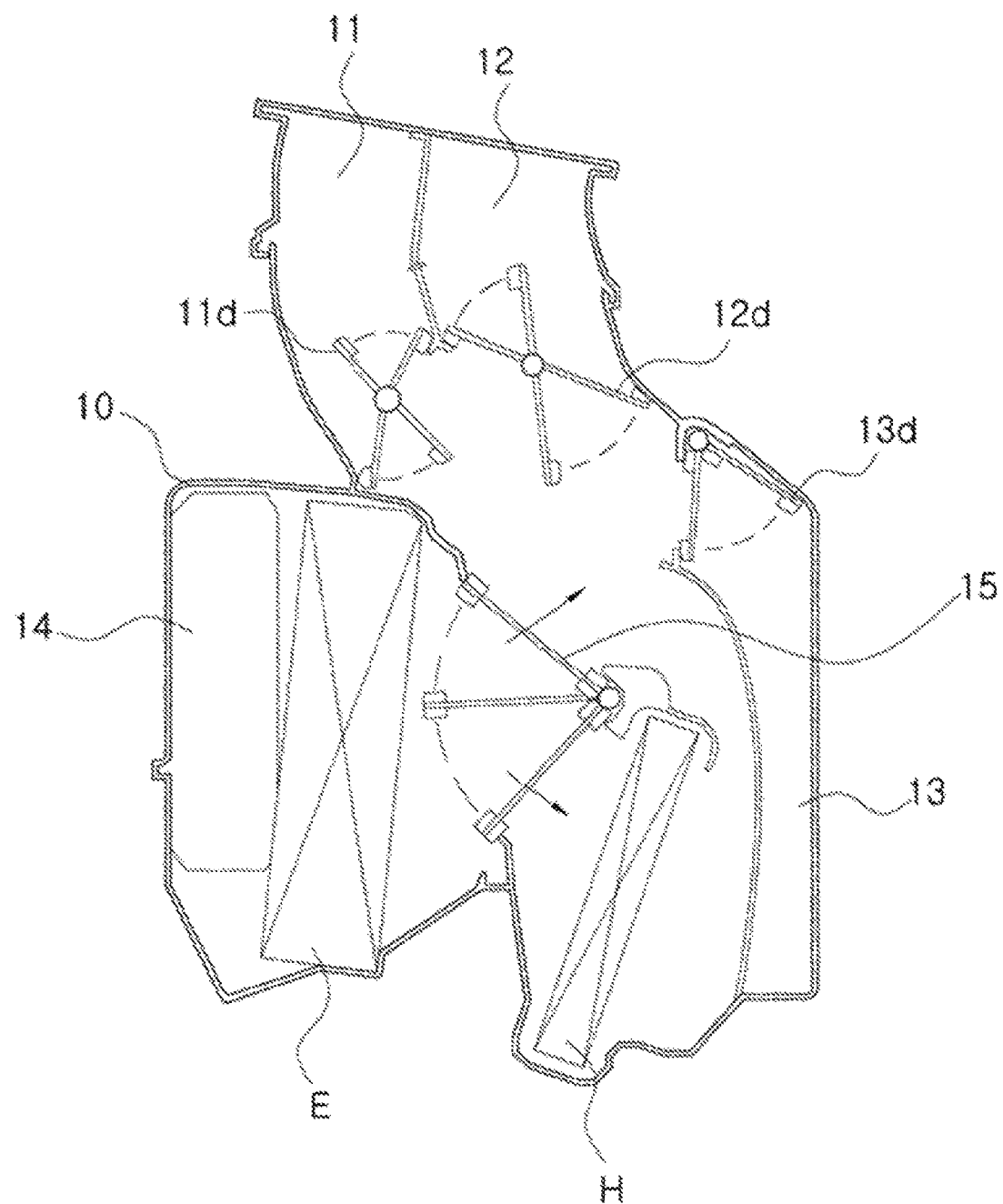
FIG. 1 is a schematic diagram showing a conventional air conditioner for a vehicle.
Figure 2:
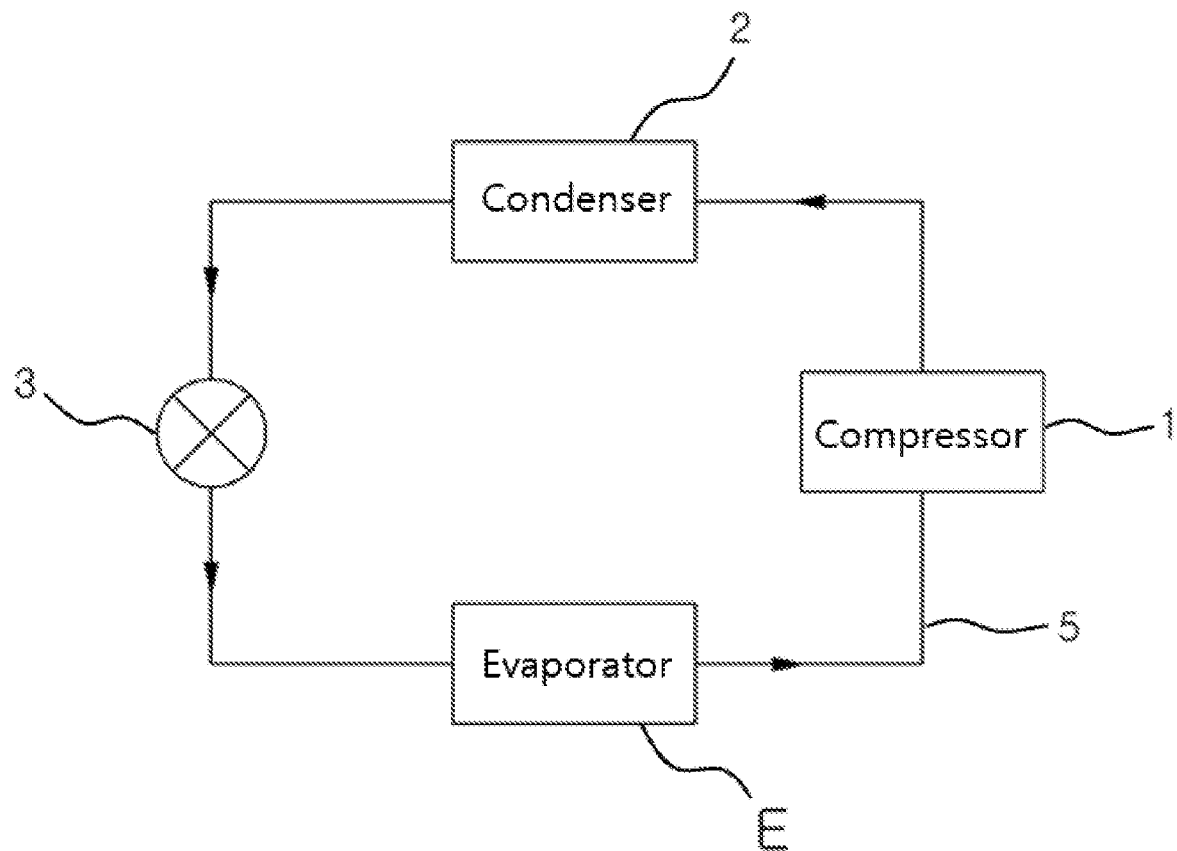
FIG. 2 is a schematic diagram showing a conventional air-conditioner cooling system.
Figure 3:
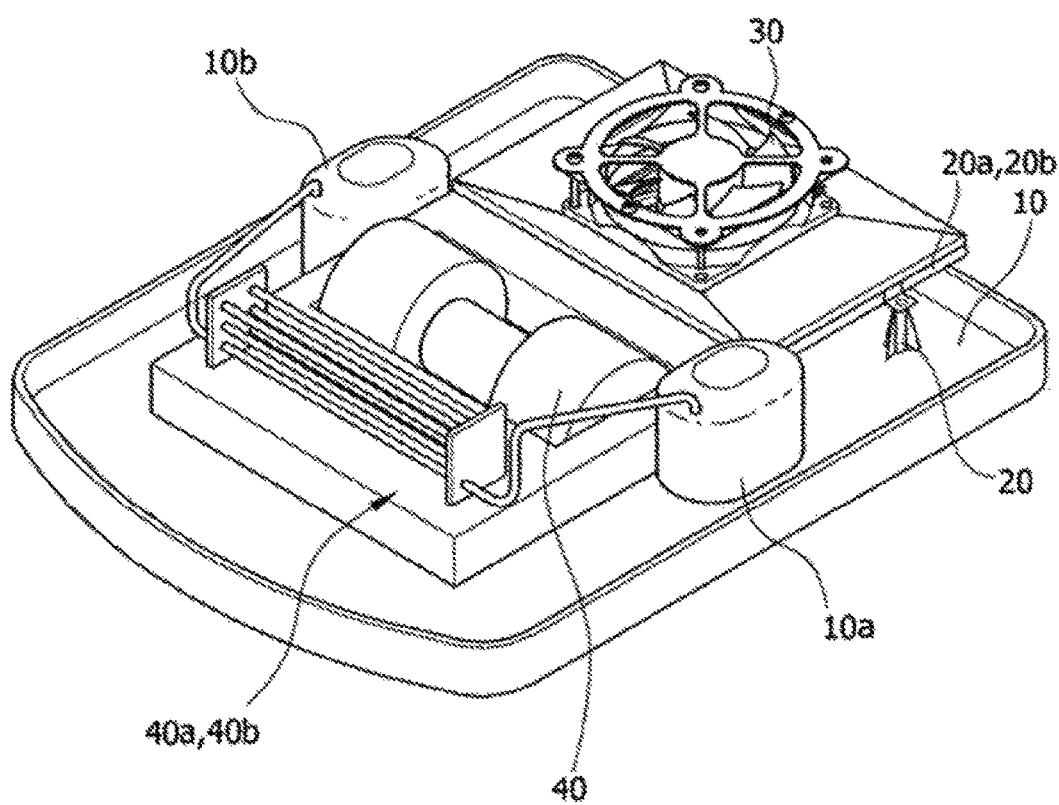
FIG. 3 is a perspective view and FIG. 4 is a schematic diagram of an anti-start air-conditioner for a vehicle.
Figure 4:
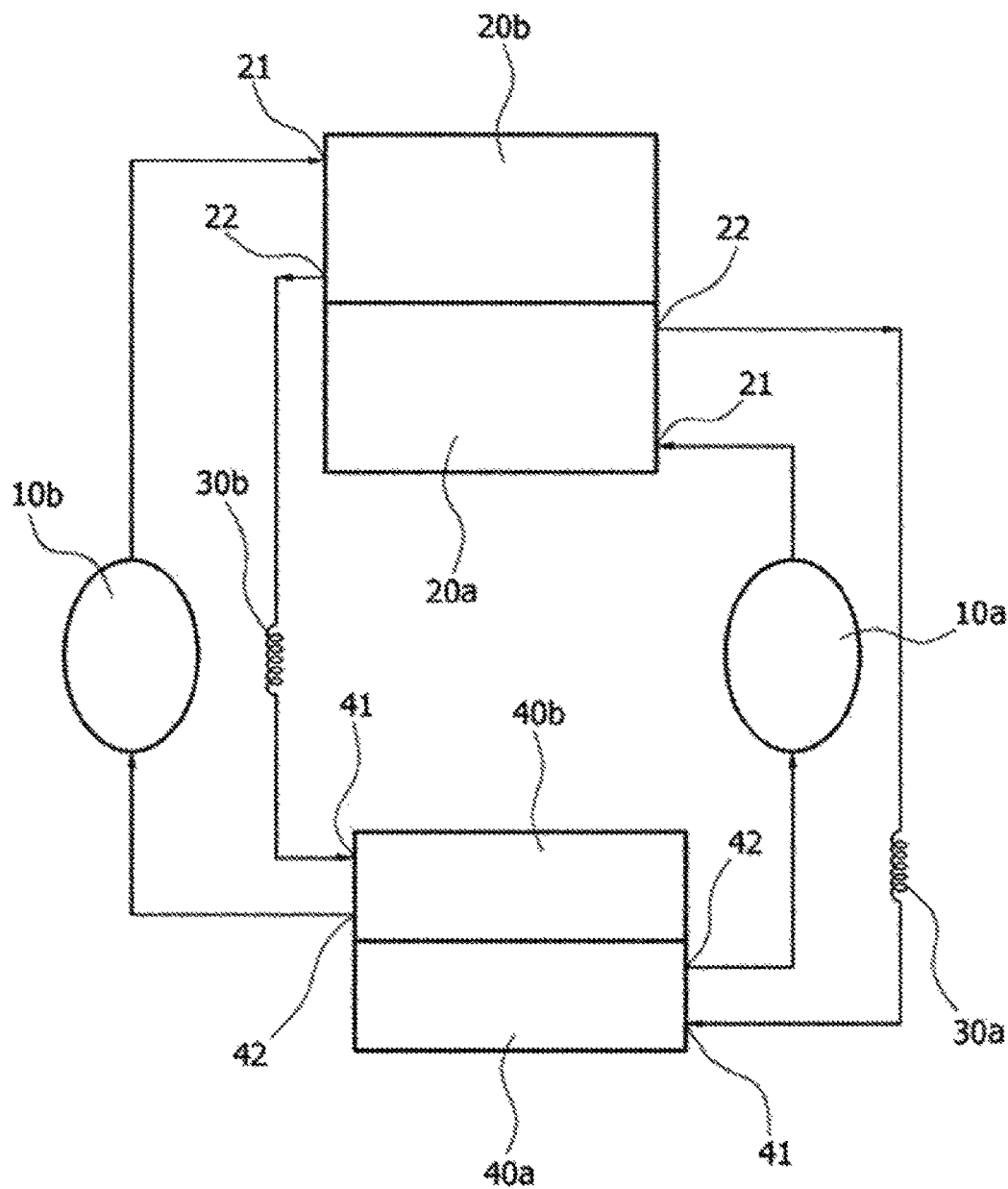
Figure 5:
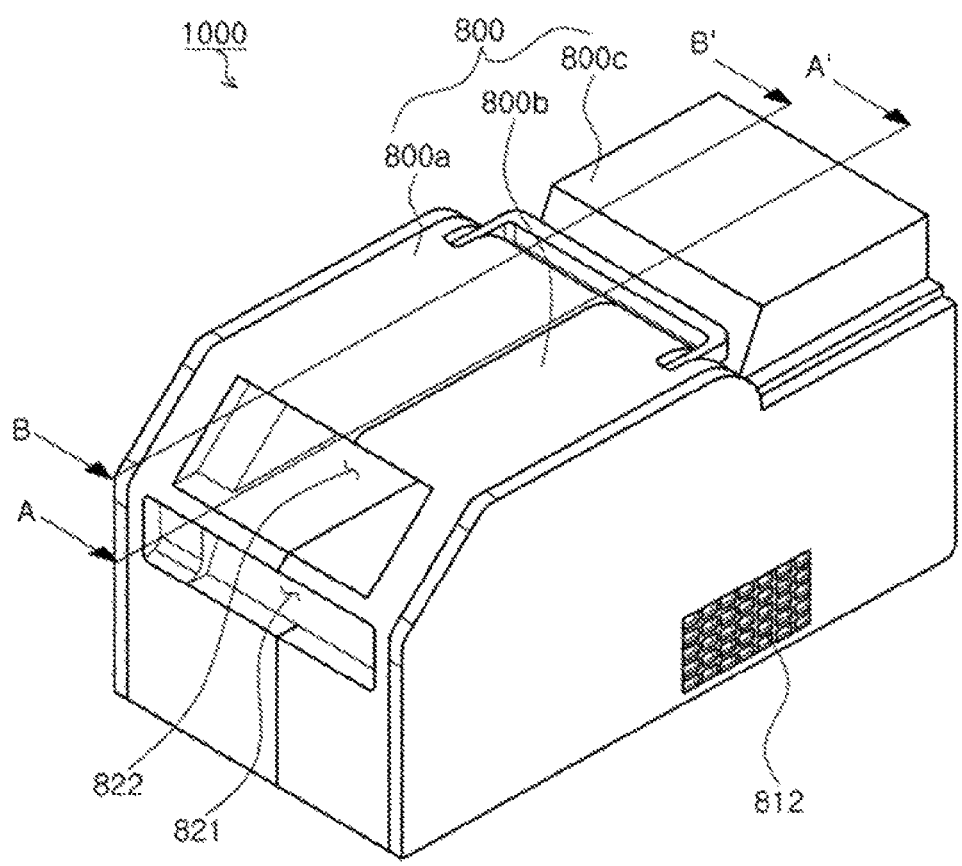
FIG. 5 is a perspective view and FIG. 6 is an exploded perspective view of an air conditioning module according to an embodiment of the present invention.
Figure 6:
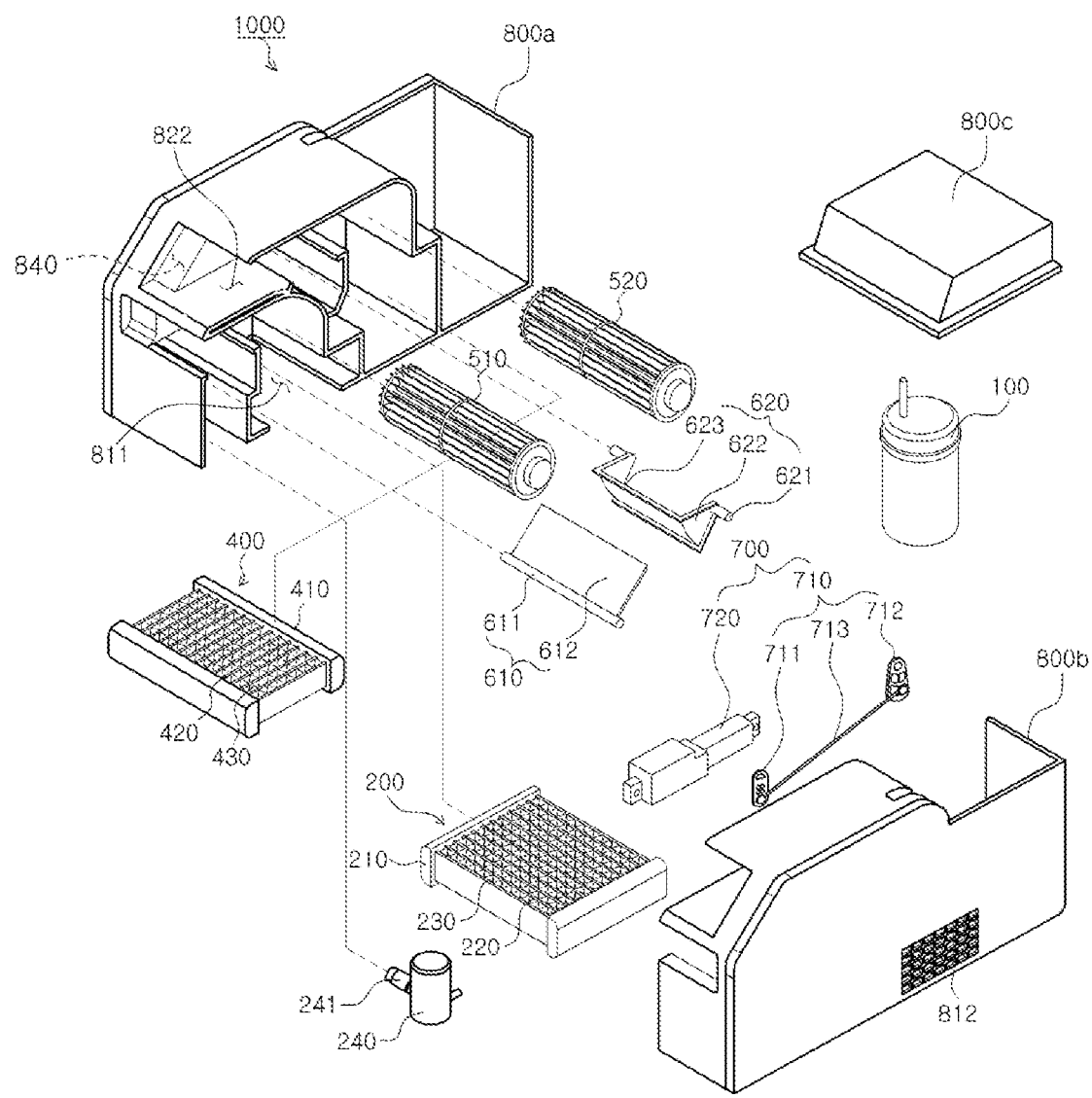
Figure 7:
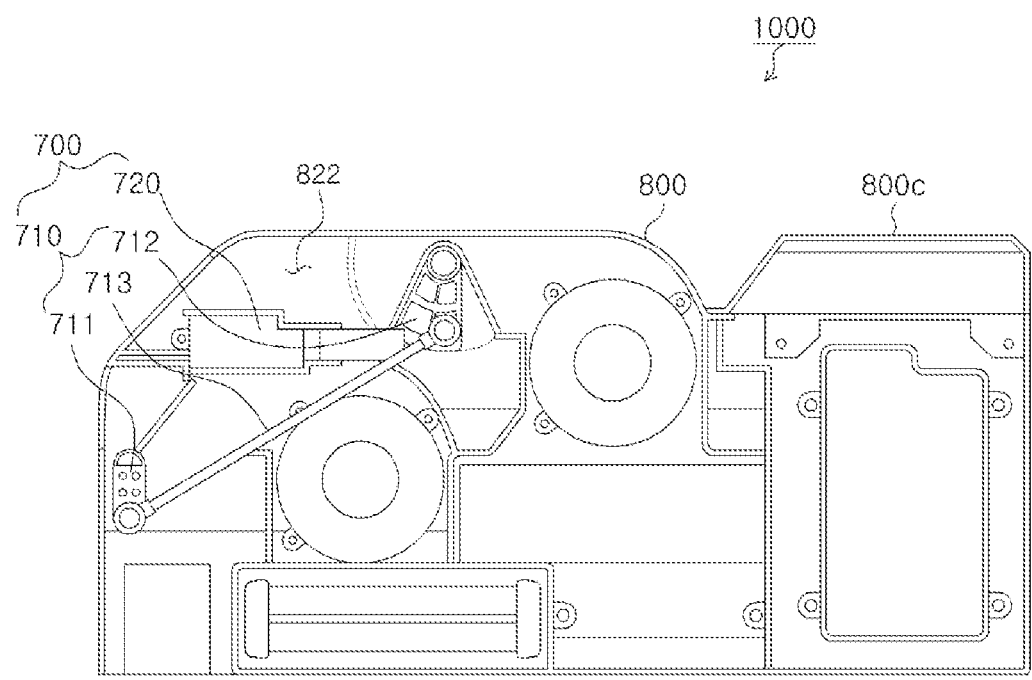
FIG. 7 is a plan view of the air conditioning module illustrated in FIG. 5.
Figure 8:
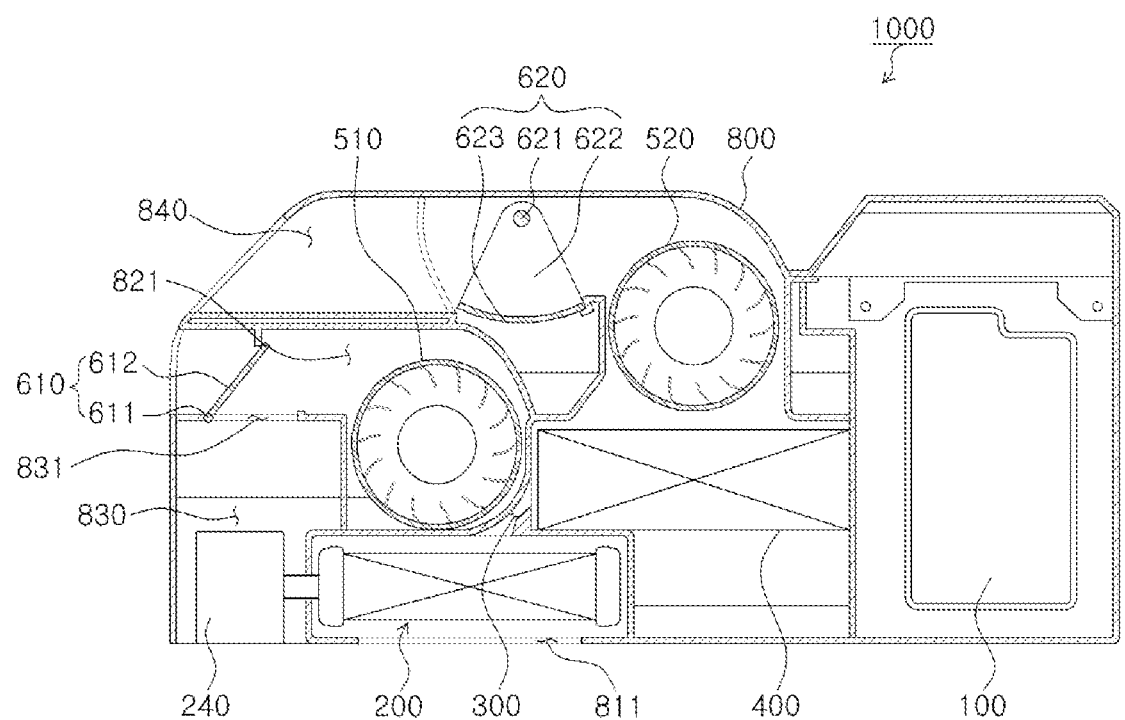
FIG. 8 is a sectional view taken along the line AA' in FIG. 5.
Figure 9:
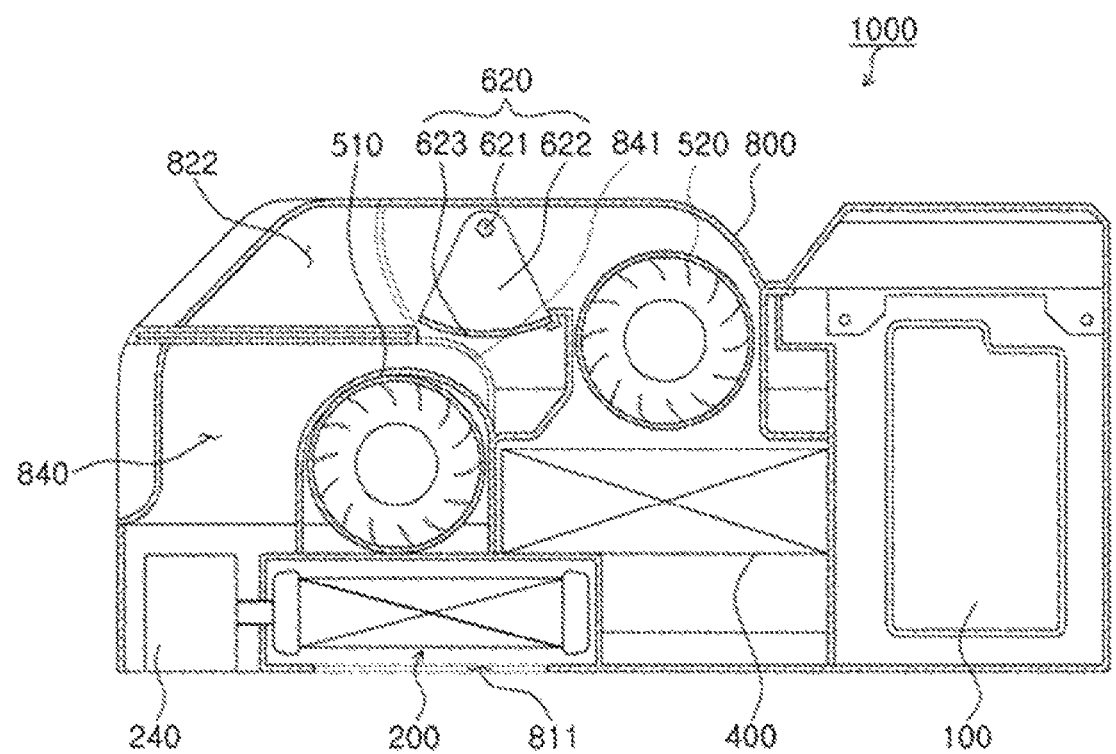
FIG. 9 is a sectional view taken along the line BB' in FIG. 5.
Figure 10:
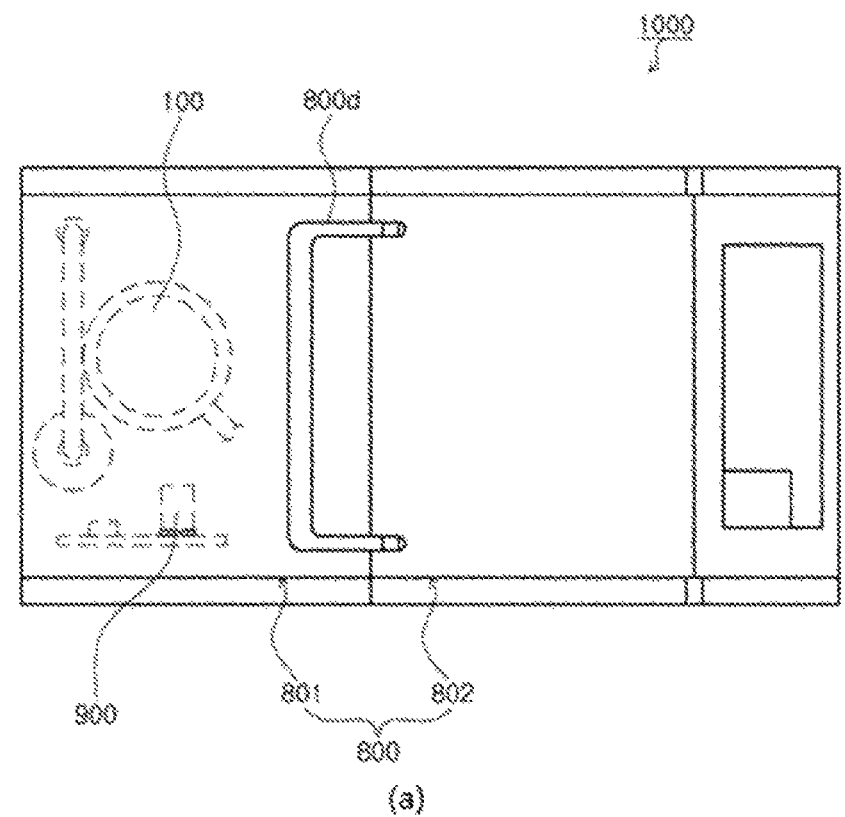
FIG. 10A is a top plan view of the air conditioning module according to the embodiment of the present invention.
FIG. 10B is a bottom plan view of the air conditioning module according to the embodiment of the present invention.
Figure 10:
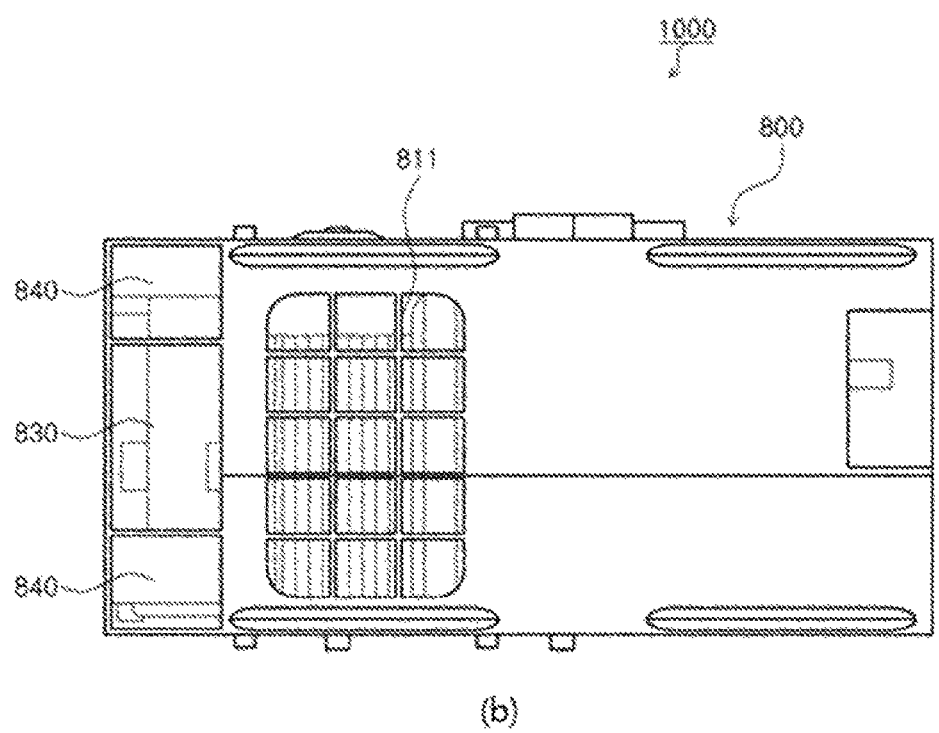
Figure 11:
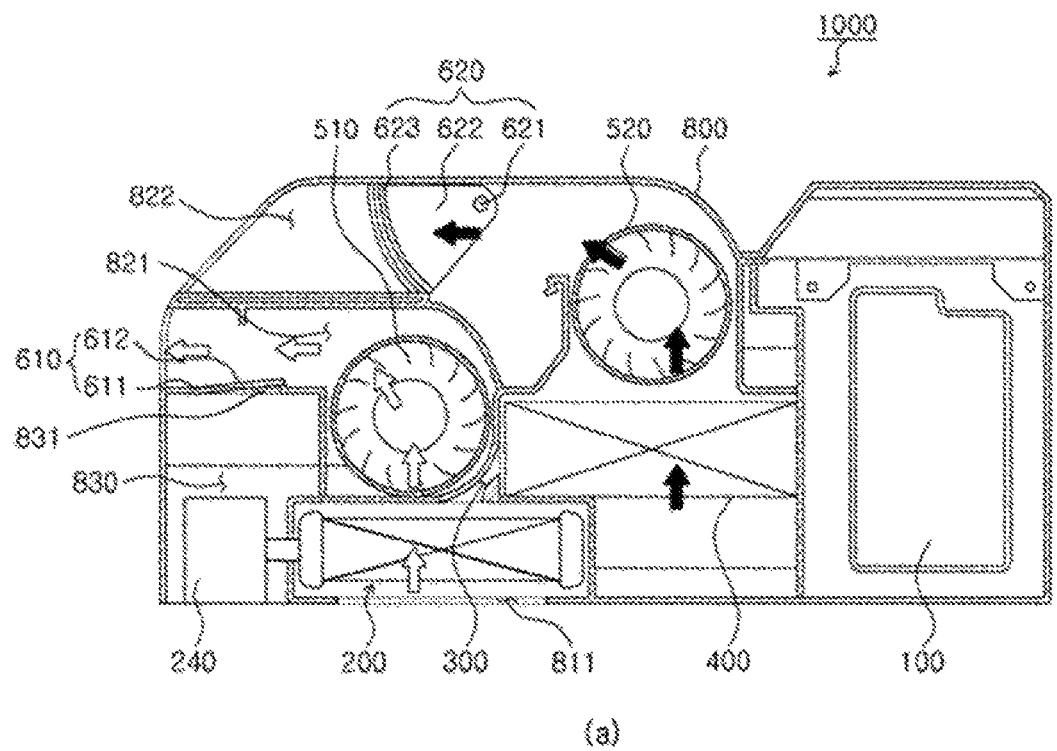
FIG. 11 is a view showing a heating state of the air conditioning module according to the embodiment of the present invention, wherein a flow of heated air supplied toward a passenger is indicated by hollow arrows, and a flow of cooled air discharged to the outside is indicated by black arrows.
Figure 11:
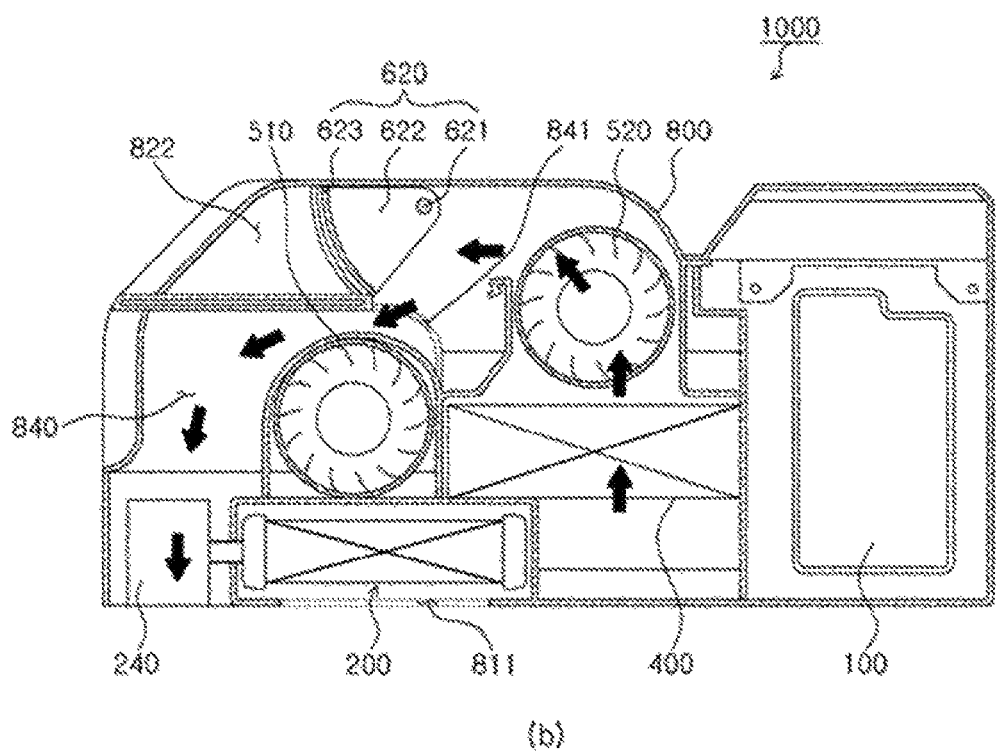
Figure 12:
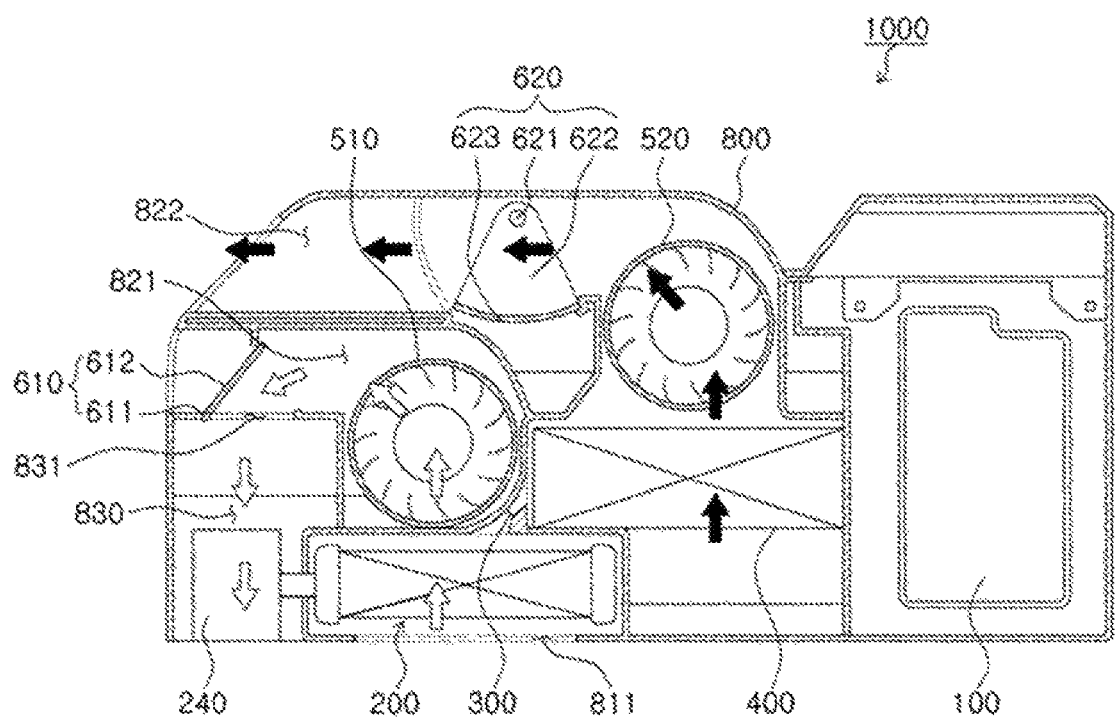
FIG. 12 is a view showing a cooling state of the air conditioning module according to the embodiment of the present invention, wherein a flow of cooled air supplied toward a passenger is indicated by black arrows, and a flow of heated air discharged to the outside is indicated by hollow arrows.

FIG. 5 is a perspective view and FIG. 6 is an exploded perspective view of an air conditioning module according to an embodiment of the present invention. FIG. 7 is a plan view of the air conditioning module illustrated in FIG. 5, FIG. 8 is a sectional view taken along the line AA' in FIG. 5, FIG. 9 is a sectional view taken along the line BB' in FIG. 5, FIG. 10A is a top plan view of the air conditioning module according to the embodiment of the present invention, and FIG. 10B is a bottom plan view of the air conditioning module according to the embodiment of the present invention. FIG. 11 is a view showing a heating state of the air conditioning module according to the embodiment of the present invention, wherein a flow of heated air supplied toward a passenger is indicated by hollow arrows, and a flow of cooled air discharged to the outside is indicated by black arrows, and FIG. 12 is a view showing a cooling state of the air conditioning module according to the embodiment of the present invention, wherein a flow of cooled air supplied toward a passenger is indicated by black arrows, and a flow of heated air discharged to the outside is indicated by hollow arrows.

The air conditioning module 1000 according to the embodiment of the present invention includes a compressor 100, a condenser 200, an expansion valve 300, an evaporator 400, a first blowing part 510, a first door 610, a second blowing part 520, a second door 620, and a housing 800.

The compressor 100 is to inhale and compress gas-phase refrigerant, and supplies the gas-phase refrigerant of high-temperature and high-pressure to the condenser 200. In this instance, the compressor 100 is operated by receiving a driving force by a power supply unit and a battery mounted inside the vehicle or an external power supply.

The condenser 200 condenses the gas-phase refrigerant into liquid of high-temperature and high-pressure by exchanging heat between the gas-phase refrigerant of high-temperature and high-pressure discharged from the compressor 100 and outside air, and then, discharges the liquid of high-temperature and high-pressure to the expansion valve 300. In this instance, the condenser 200 acts as a heating source for heating air passing through the condenser 200 when the refrigerant is condensed.

As shown in FIG. 6, the condenser 200 includes: a pair of header tanks 210 spaced apart from each other at a predetermined interval and disposed side by side to form a refrigerant passageway; a tube 220 of which both ends are fixed to the header tanks 210; a pin 230 interposed in the tube 220; and a gas-liquid separator 240 connected to the header tanks 210 to separate liquid-phase refrigerant from gas-phase refrigerant. In this instance, the gas-liquid separator 240 is located to be perpendicular to the direction that the header tanks 210, the tube 220 and the pin 230 are formed, is disposed on a first discharge passageway 830 or a second discharge passageway 840 of one side so as to maximize the formation area of the header tanks 210, the tube 220 and the pin 230. Moreover, preferably, the air conditioning module may be compact-sized and sufficiently secure an area to exchange heat with air because the blowing part 510 may be located near to the formation area of the header tanks 210, the tube 220 and the pin 230.

In this instance, the gas-liquid separator 240 may include a body 241 having a desiccating agent therein and a refrigerant filling port 242 formed at one side of the body 241 so as to facilitate replenishment of refrigerant in the state where the condenser 200 is mounted. The housing 800 related with the above will be described later.

The expansion valve 300 rapidly expands the liquid-phase refrigerant of high-temperature and high-pressure discharged from the condenser 200 by a throttling action to make it into a wet saturated state of low-temperature and low-pressure, and discharges it to the evaporator 400.

The evaporator 400 exchanges heat between outside air and the liquid-phase refrigerant of low-pressure throttled in the expansion valve 300 to vaporize the refrigerant, and then, discharges it to the compressor 100. In this instance, the condenser 200 acts as a cooling source to cool the air passing through the evaporator 400 when the refrigerant is vaporized. In FIG. 6, the evaporator 400 includes a pair of header tanks 410, a tube 420 of which both ends are fixed to the header tanks 410, and a pin 430 interposed in the tube 420.

In other words, the refrigerant circulates the compressor 100, the condenser 200, the expansion valve 300 and the evaporator 400 in order, and the compressor 100, the condenser 200, the expansion valve 300 and the evaporator 400 are connected with one another through pipes (not shown).

The first blowing part 510 is means for blowing air so that the air is heated after passing through the condenser 200, and the second blowing part 520 is means for blowing air so that the air is cooled after passing through the evaporator 400. The first blowing part 510 and the second blowing part 520 may adopt a cross flow fan type. In addition, the blowing parts 510 and 520 may adopt one of various types that can blow air to the condenser 200 and the evaporator 400.

The first door 610 regulates a flow of the air blown by the first blowing part 510, and transfers the air heated through the condenser 200 to the interior of the vehicle or discharges the heated air to the outside. Moreover, the second door 620 regulates a flow of the air blown by the second blowing part 520, and transfers the air cooled through the evaporator 400 to the interior of the vehicle or discharges the cooled air to the outside. In this instance, the first door 610 and the second door 620 may adopt one of various forms, and especially, the first door 610 includes a first rotary shaft 611 and a plate part 612 extending from the first rotary shaft 611, and the second door 620 includes a second rotary shaft 621, a pair of support part 622 vertically extending in the form of a fan shape of which the center is connected with the second rotary shaft 621, and a closed part 623 for connecting the outer peripheries of the support parts 622 with each other. That is, the first door 610 is opened such that the air flows by the plate part 612 to be supplied to the interior of the vehicle, or is closed such that the air is discharged to the outside. The second door 620 is opened such that the air flows by the closed part 623 to be supplied to the interior of the vehicle, or is closed such that the air is discharged to the outside.

Out of the components of the air conditioning module 1000, except the housing 800, the compressor 100 is the heaviest. So, the compressor 100 is arranged at one side in the longitudinal direction, and the condenser 200, the evaporator 400, the first blowing part 510 and the second blowing part 520 are arranged at the other side. Particularly, the housing 800 is divided into a first space 801 and a second space 802 in the longitudinal direction, and the components of the air conditioning module 1000 are mounted inside the housing 800. In this instance, the first space 801 is an area where the compressor 100 is disposed, and the second space 802 is an area where the rest components except the compressor 100, namely, the condenser 200, the expansion means 300, the evaporator 400, the first blowing part 510, the first door 610, the second blowing part 520 and the second door 620, are disposed. In other words, the second space 802 is a space for transferring or discharging the air supplied through the first blowing part 510 and the second blowing part 520 to the interior of the vehicle by actuation of the first door 610 and the second door 620. Therefore, the air conditioning module 1000 according to the embodiment of the present invention keeps balance of weight in the longitudinal direction.

Moreover, the housing 800 includes a handle 800d such that a user can carry the air conditioning module 1000. The handle 800d is disposed at the upper side of the housing 800 and is located in consideration of the center of gravity in the longitudinal direction.

Additionally, preferably, the air conditioning module 1000 according to the embodiment of the present invention includes a circuit board 900, which is disposed in the first space 801 of the housing 800 in order to operate the compressor 100. In the present invention, the circuit board 900 means electronic parts having an inverter and others in order to prevent energy loss when the circuit board 900 gets farther apart from the position of the compressor 100. Furthermore, preferably, the circuit board 900 is located at right angles to the longitudinal direction to minimize a damage by condensate water. That is, the circuit board 900 is mounted in such a way that the side of the circuit board 900 is perpendicular to the bottom surface of the housing 800.

In order to formed an air flow that air is supplied to the interior of the vehicle or discharged to the outside after being induced into the housing 800 and heated or cooled, in the housing 800 in which the condenser 200, the expansion means 300, the evaporator 400, the first blowing part 510, the first door 610, the second blowing part 520 and the second door 620 are mounted, a first inflow part 811 and a second inflow part 812 are formed to be hollow, and a first passageway 821 and a second passageway 822 are formed therein to supply the heated or cooled air to the interior of the vehicle.

The first inflow part 811 is a hollow area formed at a certain area of the housing 800 to transfer the air to the condenser 200, and the second inflow part 812 is a hollow area formed at a certain area of the housing 800 to transfer the air to the evaporator 400. In FIGS. 5 to 9, it is illustrated that the first inflow part 811 is formed on the bottom of the housing 800, and the second inflow part 812 is formed on the side of the housing 800 (the front side in FIGS. 5 to 7), but the first and second inflow parts 811 and 812 may be formed on one of various positions that can transfer the air to the condenser 200 and the evaporator 400.

The first passageway 821 is formed inside the housing 800 to form a space that the air passing through the condenser 200 is transferred to the interior of the vehicle, and the condenser 200, the first blowing part 510, and the first door 610 are mounted on the first passageway 821. Furthermore, the second passageway 822 is formed inside the housing 800 to form a space that the air passing through the evaporator 400 is transferred to the interior of the vehicle, and the evaporator 400, the second blowing part 520, and the second door 620 are mounted on the second passageway 822. In this instance, it is preferable that certain areas of the first and second passageways 821 and 822, which discharge air to the interior of the vehicle, be formed to be adjacent to each other in the height direction such that the first passageway 821 and the second passageway 822 facilitate designing a flow of air.

Moreover, the housing 800 includes a first discharge passageway 830 connected with the first passageway 821 and a second discharge passageway 840 connected with the second passageway 822 to discharge air, which is not supplied to a passenger. The first discharge passageway 830 is openable and closable by the first door 610 and is a passageway formed by extending from a first discharge hole 831 hollowed at a certain area of the first passageway 821 to discharge air to the outside. Furthermore, the second discharge passageway 840 is openable and closable by the second door 620 and is a passageway formed by extending from a second discharge hole 832 hollowed at a certain area of the second passageway 822 to discharge air to the outside.

In this instance, the first discharge passageway 830 and the second discharge passageway 840 are formed to be adjacent to each other, and are opened toward the bottom surface of the housing 800. That is, the first passageway 821 and the second passageway 822 for supplying air to the interior of the vehicle are formed at one side of the housing 800, and the first discharge passageway 830 and the second discharge passageway 840 for discharging air to the outside are opened to the bottom surface of the housing 800. Moreover, the first discharge passageway 830 and the second discharge passageway 840 are formed to be adjacent to each other. Preferably, the first discharge passageway 830 is located in the middle in the longitudinal direction of the first door 610 and the second door 620, and the second discharge passageway 840 is formed at both sides of the first discharge passageway 830 (See the bottom plan view of FIG. 10). Therefore, the air conditioning module 1000 according to the preferred embodiment of the present invention can easily heat and cool the air to supply the heated or cooled air to the interior of the vehicle, and easily discharge unnecessary air to the outside, thereby enhancing cooling and heating comfort and miniaturizing the size of the air conditioning module.

Furthermore, in the housing 800, actuating means 700 for actuating the first door 610 and the second door 620 and a certain area of a pipeline (not shown) may be located on the second discharge passageway 840 where the air cooled after passing through the evaporator 400 is not supplied to the interior of the vehicle but is discharged. In this instance, the actuating means 700 is an actuator 720, and the pipeline is to connect the compressor 100, the condenser 200, the expansion means 300 and the evaporator 400 and most area of the pipeline is located on the second discharge passageway 840. Therefore, the air conditioning module 1000 according to the preferred embodiment of the present invention can protect the actuating means 700 and the pipeline, which are located outside the air-conditioning case in the case of conventional air conditioners, because the actuating means 700 and the pipeline are located inside the housing 800, and can be cooled while the air cooled through the evaporator 400 flows.

Referring to FIG. 11 showing a heating state, the first door 610 opens the first passageway 821 to transfer the heated air to the interior of the vehicle, and closes the first discharge hole 831 to close a flow which discharges the heated air to the outside. In this instance, the second door 620 closes the second passageway 822 to prevent the cooled air from being transferred to the interior of the vehicle, and opens the second discharge hole 832 to discharge the cooled air to the outside. In FIG. 11, the flow of the heated air supplied to the interior of the vehicle is indicated by hollow arrows, and a flow of the cooled air discharged to the outside is indicated by black arrows, wherein FIG. 11A shows the air flow using the sectional view of FIG. 5 taken along the line AA', in which the first passageway 821, the second passageway 822 and the first discharge passageway 830 are formed, and FIG. 11B shows the air flow using the sectional view of FIG. 5 taken along the line BB', in which the second passageway 822 and the second discharge passageway 840 are formed.

On the contrary, referring to FIG. 12 showing a cooling state, the second door 620 opens the second passageway 822 to transfer the heated air to the interior of the vehicle, and closes the second discharge hole 832 to close a flow which discharges the cooled air to the outside. In this instance, the first door 610 closes the first passageway 821 to prevent the cooled air from being transferred to the interior of the vehicle, and opens the first discharge hole 831 to discharge the heated air to the outside.

In the meantime, in the air conditioning module 1000 according to the preferred embodiment of the present invention, the housing 800 may include a first housing 800a and a second housing 800b, which are combined at both sides in the longitudinal direction of the compressor 100, the condenser 200, the expansion means 300, the evaporator 400, the first blowing part 510, the first door 610, the second blowing part 520, and the second door 620. The compressor 100 is easy in mounting but may generate noise, so may be formed to be openable and closable by a cover 800c.

Furthermore, the expansion means 300 may be embedded in the housing 800. As described above, because the refrigerant circulates the compressor 100, the condenser 200, the expansion valve 300 and the evaporator 400 in order, the expansion means 300 is embedded in the area of the housing 800, which partitions the condenser 200 from the evaporator 400, and a pipeline in which the refrigerant discharged from the condenser 200 flows and a pipeline in which refrigerant is supplied to the evaporator 400 may be connected to the area where the expansion means 300 is formed. Particularly, the expansion means 300 may have an orifice form of which the inner space decreases gradually and increases gradually because the expansion means 300 corresponds to an area formed in the housing 800 as the space through which the refrigerant passes (See FIG. 8). Therefore, the air conditioning module 1000 according to the preferred embodiment of the present invention can reduce the number of components and time and costs required for assembly because there is no need to additionally prepare and assemble the expansion means 300.

The air conditioning module 1000 according to the preferred embodiment of the present invention may further include actuating means 700, which is connected with the first door 610 and the second door 620 to open the first door 610 and close the second door 620 or to close the first door 610 and open the second door 620. That is, the actuating means 700 makes the first door 610 and the second door 620 work together. The actuating means 700 controls in such a way that the second door 620 is closed when the first door 610 is opened and the second door 620 is opened when the first door 610 is closed.

In an embodiment, the actuating means 700 includes a link member 710 for connecting the first door 610 and the second door 620 with each other and an actuator 720 for actuating the link member 710. The link member 710 includes a first door lever 711 combined with a first rotary shaft 611 of the first door 610, a second door lever 712 combined with a second rotary shaft 621 of the second door 620, and a connection link 713 for connecting the first door lever 711 and the second door lever 712 with each other. In the case that the first door lever 711 and the first rotary shaft 611 connected with the first door lever 711 are rotated by operation of the actuator 720 to open the first door 610, the second door lever connected through the connection link 713 and the second rotary shaft 621 connected with the second door lever are also rotated to close the second door 620. Moreover, in the case that the first door lever and the first rotary shaft 611 connected with the first door lever are rotated by operation of the actuator 720 to close the first door 610, the second door lever connected through the connection link 713 and the second rotary shaft 621 connected with the second door lever are also rotated to open the second door 620. Therefore, the air conditioning module 1000 according to the embodiment of the present invention can control the first door 610 and the second door 620 to work together by operation of the actuator 720, thereby being easy in working.

The air conditioning module 1000 described above can be used as an apparatus for cooling and heating the interior of the vehicle because performing not only cooling but also heating as a single unit. Additionally, because the air conditioning module 1000 according to the present invention can be detachably mounted on the vehicle by a passenger, it can be detached from the vehicle and used outside the vehicle if there is a need to adjust temperature outside the vehicle. In the present invention, the "passenger" may be interpreted as a "user", who uses the air conditioning module 1000 outside the vehicle, and the direction may be the side that air is discharged through the first passageway 821 and the second passageway 822. During outdoor activities, if air conditioning is needed, the air conditioning module 1000 according to the present invention may be operated by a battery of the vehicle or an external power supply. Moreover, the air conditioning module 1000 may be mounted at one of various places from which the air conditioning module 1000 can be attached and detached. As an example, the air conditioning module 1000 can be mounted on a glove box, a console box, a space between the rear seat and the rear window, or the floor of the vehicle. The present invention is not restricted to the above, and the air conditioning module 1000 can be mounted at any place where the air conditioning module 1000 can be detachably mounted. The air conditioning module 1000 according to the present invention may be controlled by a main control system of the vehicle, or controlled independently from the main control system. In other words, the air conditioning module 1000 according to the present invention may be operated independently from the main control system, which controls interior air conditioning of the vehicle, regardless the cases that the air conditioning module performs interior air conditioning of the vehicle or is used outside the vehicle.

While the present invention has been particularly shown and described with reference to exemplary embodiments thereof, it will be understood by those of ordinary skill in the art that various changes in form and details may be made therein without departing from the spirit and scope of the present invention as defined by the following claims.

The air conditioning module according to the preferred embodiment of the present invention is an apparatus, which may be applied to air conditioners for various vehicles, to heat or cool the interior of the vehicle or to defrost the windshield of the vehicle. So, the air conditioning module is used as a car internal, which offers convenience for a driver.

The invention claimed is:

1. An air conditioning module comprising:
a compressor for inhaling and compressing a refrigerant;

a condenser for condensing the refrigerant compressed in the compressor;

expansion means for throttling the refrigerant condensed in the condenser;

an evaporator for evaporating the refrigerant supplied through the expansion means;

a housing including a first passageway for transferring air passing through the condenser to an interior of a vehicle, a second passageway for transferring air passing through the evaporator to the interior of the vehicle, a first discharge passageway through which the air passing through the condenser is discharged out, and a second discharge passageway, which is formed adjacent to the first discharge passageway, and through which the air passing through the evaporator is discharged out;

a first blowing part for blowing the air to pass through the condenser to be heated;

a first door for adjusting a flow of the air blown by the first blowing part;

a second blowing part for blowing the air to pass through the evaporator to be cooled; and a second door for adjusting a flow of the air blown by the second blowing part, wherein the first discharge passageway is located in the middle in the longitudinal direction of the first door and the second door, and the second discharge passageway is formed at both sides of the first discharge passageway.

2. The air conditioning module according to claim 1, wherein the housing comprises:

a first inflow part hollowed at a first area of the housing to transfer the air to the condenser; and a second inflow part hollowed at a second area of the housing to transfer the air to the evaporator.

3. The air conditioning module according to claim 2, wherein the first blowing part and the first door are mounted inside the first passageway of the housing, wherein the second blowing part and the second door are mounted inside the second passageway of the housing, wherein a first discharge hole, which is hollowed at a certain area of the first passageway, is opened and closed by the first door, and wherein a second discharge hole, which is hollowed at a certain area of the second passageway, is opened and closed by the second door.

4. The air conditioning module according to claim 3, wherein during heating, the first door closes the first discharge hole and opens the first passageway and the second door closes the second passageway and opens the second discharge hole such that the air heated by passing through the condenser is transferred to the interior of the vehicle through the first passageway and the air cooled by passing through the evaporator is discharged through the second discharge hole and the second discharge passageway, and wherein during cooling, the second door closes the second discharge hole and opens the second passageway and the first door closes the first passageway and opens the first discharge hole such that the air cooled by passing through the evaporator is transferred to the interior of the vehicle through the second passageway and the air heated by passing through the condenser is discharged through the first discharge hole and the first discharge passageway.

5. The air conditioning module according to claim 1, wherein parts of the first passageway and the second passageway, which protrude toward a passenger, are formed at one side of the housing to be side by side in a height direction.

6. The air conditioning module according to claim 1, wherein the first discharge passageway and the second discharge passageway are opened to a bottom surface of the housing.

7. The air conditioning module according to claim 1, wherein in the housing, actuating means for actuating the first door and the second door and a certain area of a pipeline for connecting the compressor, the condenser, the expansion means and the evaporator are located on the second discharge passageway.

8. The air conditioning module according to claim 1, wherein the air condition module has the expansion means of an orifice form of which an inner space, through which the refrigerant passes, decreases from a first end of the inner space to an intermediate portion of the inner space and increases from the intermediate portion of the inner space to a second end of the inner space and is embedded in the housing.

9. The air conditioning module according to claim 1, wherein the first blowing part and the second blowing part adopt a cross flow fan type.

10. The air conditioning module according to claim 1, wherein the condenser, the evaporator, the first blowing part, and the second blowing part are mounted at a side of the housing in a longitudinal direction.

11. The air conditioning module according to claim 1, wherein the housing is divided into a first space and a second space in a longitudinal direction, and the compressor is mounted in the first space and the condenser, the expansion means, the evaporator, the first blowing part, the first door, the second blowing part, and the second door are mounted in the second space.

12. The air conditioning module according to claim 11, further comprising a circuit board disposed in the first space of the housing to operate the compressor.

13. The air conditioning module according to claim 12, wherein the circuit board is perpendicular to the longitudinal direction.

14. The air conditioning module according to claim 1, wherein the housing forms a space where the air supplied through the first blowing part and the second blowing part is transferred to the interior of the vehicle or is discharged out by actuation of the first door and the second door.

15. The air conditioning module according to claim 1, wherein the housing further comprises a handle located at an upper side thereof in consideration of a center of gravity of a longitudinal direction.

* * * * *